UNITED STATES PATENT OFFICE.

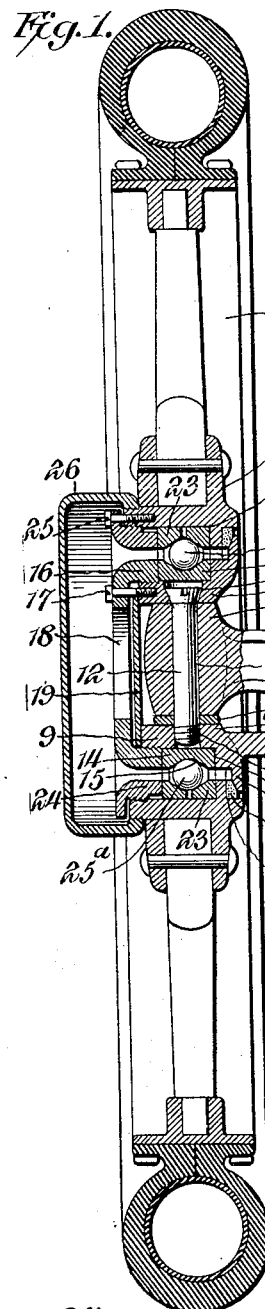

CLARENCE F. UMHOLTZ, OF BRISTOL, VIRGINIA.

VEHICLE-WHEEL BEARING MECHANISM.

No. 925,536.      Specification of Letters Patent.      Patented June 22, 1909.

Application filed March 23, 1908. Serial No. 422,777.

*To all whom it may concern:*

Be it known that I, CLARENCE F. UM-HOLTZ, a citizen of the United States, residing at Bristol, in the county of Washington and State of Virginia, have invented a new and useful Vehicle-Wheel Bearing Mechanism, of which the following is a specification.

This invention relates more especially to improvements in the bearing mechanism of the steering wheels for self-propelled vehicles, and is in the nature of an improvement on the structure disclosed in copending application, Serial No. 390,988, filed Aug. 31, 1907.

The primary object of the present invention is to provide a novel, and simple bearing that is very compact in its character, is constructed of parts that are readily accessible, and is so arranged that the wheels will not only not be thrown to one side when they meet obstructions, but will be maintained in their position straight ahead, and will automatically return to said positions after they have been turned to one side or the other by the steering mechanism.

Two embodiments of the invention are illustrated in the accompanying drawings, wherein:—

Figure 1 is a vertical sectional view through a wheel and its bearing showing the preferred form of construction. Fig. 2 is a view in elevation of the bearing mechanism looked at from the inner side. Fig. 3 is a horizontal sectional view through a portion of the bearing. Fig. 4 is a vertical sectional view through a slightly modified form of construction.

Similar reference numerals designate corresponding parts in all the figures of the drawings.

Referring first to the embodiment disclosed in Figs. 1, 2 and 3, a portion of the front axle of a vehicle is shown, and is designated 5. The axle terminates in a head 6 having an opening 7 therethrough. This head as will be clear by reference to Fig. 2, is disposed at an inclination to the vertical, and its top and bottom faces are flat. A bearing washer 8 is located against the lower face, and a collar 9 surrounds the head, and is provided with diametrically opposite bosses 10 bearing against the top face of the head and against the washer 8. The collar 9 is provided with diametrically opposite openings 11 alined with the openings 7, and passing through the upper opening, is a pivot 12 that passes through the bosses and through the head. It will be noted by reference to Fig. 2 that this pivot, and consequently the axis upon which the collar 9 turns, is disposed at an inclination to the perpendicular, the pivot being downwardly and forwardly inclined.

The collar 9 is provided with a peripheral stop shoulder 13, and mounted on said collar is an inner bearing ring 14, the ring being abutted against the shoulder 13, and surrounding the pivot 12. This ring is provided with a ball race 15, and said ring is held in place by a retaining ring 16 threaded upon the outer end of the collar and abutting against the ring. The retaining ring 16 is normally held against rotation on the collar by a screw 17 passing through the retaining ring and engaged in the end of the collar. The retaining ring has an inwardly extending flange 18, and interposed between said flange and the outer end of the collar 9 is a closure disk 19.

The wheel is designated as a whole by the reference numeral 20, and includes a hub 21 that is journaled on the collar 9. This hub is provided with an internal stop shoulder 22, and located within the hub, is an outer bearing ring comprising sections 23. The outer bearing ring is abutted against the shoulder 22, and is held in place by a retaining and adjusting ring 24 threaded into the outer end of the hub and normally held against rotation on the hub by a screw 25. Interposed between the inner and outer bearing rings are antifriction devices in the form of balls 25ª. The retaining rings 16 and 24 are normally covered by a cap 26 threaded upon the hub, as shown. This cap excludes all dirt and dust from the bearing. The joint between the inner end of the collar 9 and the hub is closed by a packing ring 27 seated in a groove 28 formed in the hub and borne against by a flange 29 carried by the collar. This collar also has a suitable arm 30 on its inner end to which the steering gear is connected.

A modification of the invention is disclosed in Fig. 4. In this structure, the axle 31 is provided with a head 32, and the collar 33, pivoted to the head by an inclined screw 34, has an extension in the form of a spindle 35. An inner bearing ring 36, composed of sections, is fitted upon the collar, and surrounds the pivot 34, being held in place by a retaining ring 37 normally held against movement by a screw 37ª. An outer bearing ring 38 is fitted within the hub 39 of the wheel, and abuts against a shoulder 40 formed in said hub. Anti-friction balls 41 are interposed between the inner and outer bearing rings. It will be noted, that, as in the first described embodiment, this form of structure discloses the inner and outer bearing rings, the balls and the pivot as being disposed in a vertical plane extending centrally of the wheel.

The hub 39 of the structure disclosed in Fig. 4 is extended outwardly, as shown at 42, to surround the spindle extension 35 of the collar, and coöperating inner and outer bearing rings 43 are respectively arranged on the spindle 35 and extension 42, being abutted against shoulders 44 and 45. The inner bearing ring is held in place by a washer 46 and a nut 47 that is threaded on the end of the spindle 35 and abuts against the washer. The outer bearing ring is retained in place by a ring 48 threaded into the outer end of the extension 42 and secured by a screw 48ª. Balls 49 are arranged between the inner and outer bearing rings, and a cap 50, threaded upon the head extension 42, covers the bearings and the adjusting devices.

There are decided advantages for the structure disclosed. In the first place, the pivots in the centers of the wheels and the inclination of said pivots insure that the wheels will maintain their straight-ahead position, and at the same time produce a structure that is of a very simple character. Moreover the wheels incline themselves on a curve and there is no road strain on the steering gear when moving in a straight line. Furthermore there is no jar on said steering gear from obstructions in the road. An additional advantage resides in the ease of control of the steering mechanism and the impossibility of losing control of the same. Furthermore when moving on a curve, the body of the car is not inclined to run over the wheels. Thus danger of accident is reduced to a minimum.

From the foregoing, it is thought that the construction, operation and many advantages of the hereindescribed invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In mechanism of the character set forth, the combination of an axle, a collar arranged on the end of the axle, a pivot piercing the axle and the collar and located within the periphery of the latter, a hub surrounding the collar and provided with an internal shoulder, anti-friction devices interposed between the collar and the hub, a bearing ring for the said devices located within the hub and abutting against the shoulder thereof, said hub having its outer end interiorly and exteriorly threaded, a holding ring threaded into the hub and abutting against the outer side of the bearing ring, and a cap threaded on the exterior of the hub and covering its outer end.

2. In mechanism of the character set forth, the combination of an axle, a collar arranged on the axle and having a shoulder, a pivot piercing the axle and the collar, a hub surrounding the collar and having an internal shoulder, an inner bearing ring detachably fitted on the collar and surrounding the pivot and abutting against the shoulder of the collar, an outer bearing ring fitted within the hub and abutting against the shoulder thereof, one of said bearing rings being sectional and the other bearing ring being in one piece, balls interposed between the bearing rings, an inner retaining ring threaded on the collar and engaging the inner bearing ring at the side opposite to that which bears against the shoulder of the collar, and a screw piercing the inner retaining ring and engaging the collar and holding the retaining ring against rotation.

3. In mechanism of the character set forth, the combination of an axle, a collar arranged on the axle, a pivot piercing the axle and the collar, a hub surrounding the collar and having an internal shoulder, an outer sectional bearing ring fitting within the hub and abutting against the shoulder, means mounted on the hub for securing the bearing ring in place, an inner bearing ring arranged on the collar, balls interposed between the bearing rings, the inner bearing ring being in one piece and removable from the collar with the hub, whereby the bearing may be removed intact with the wheel.

4. In mechanism of the character set forth, the combination of an axle, a collar arranged on the axle and having a shoulder, a hub surrounding the collar having an internal shoulder, an outer sectional bearing ring fitted within the hub and abutting against the shoulder thereof, an outer retaining ring mounted on the hub and bearing against the opposite side of the bearing ring to that which bears against the shoulder of the hub, an inner one-piece bearing ring fitted against the shoulder of the collar, balls interposed between the bearing rings, and an inner detachable retaining ring mounted on the collar and securing the inner bearing ring thereon and adapted to permit the same to be detached therefrom, whereby the bearing may be removed intact with the wheel.

5. In mechanism of the character set forth, the combination of an axle, a collar arranged on the axle and provided with a shoulder, a hub surrounding the collar, an inner bearing ring fitted on the collar and abutting against the shoulder, a retaining ring mounted on the collar and engaging the inner bearing ring and provided with an inwardly extending flange, balls interposed between the hub and the inner bearing ring, and a closure disk fitted between the collar and the inwardly extending flange of the retaining ring.

6. In mechanism of the character set forth, the combination of an axle, a collar arranged on the axle and having an inner stop shoulder, a pivot piercing the axle and the collar and located within the periphery of the latter, an inner bearing ring mounted on the collar and having one side abutting against the shoulder, a retaining ring threaded on the collar and abutting against the other side of the bearing ring to hold it in place, a device for securing the retaining ring against rotation, a hub surrounding the collar and provided with the internal shoulder, an outer bearing ring fitted within the hub and having one side bearing against the shoulder thereof, a retaining ring threaded into the hub and abutting against the other side of the outer bearing ring, balls interposed between the bearing rings and located in the plane of the pivot, and a cap threaded on the hub and covering the retaining ring.

In testimony, that I claim the foregoing as my own, I have hereto affixed my signature in the presence of two witnesses

CLARENCE F. UMHOLTZ.

Witnesses.
 A. H. BLANCHARD,
 C. W. UMHOLTZ.